United States Patent [19]

Inman et al.

[11] Patent Number: 5,724,793
[45] Date of Patent: Mar. 10, 1998

[54] MATERIALS BAGGER AND SYSTEM

[75] Inventors: Larry R. Inman, Astoria; Ronald V. Garvin, Warrenton; Michael C. Stenblom, Astoria, all of Oreg.

[73] Assignee: Ag-Bag International, Ltd., Warrenton, Oreg.

[21] Appl. No.: 720,310

[22] Filed: Sep. 27, 1996

Related U.S. Application Data

[63] Continuation of Ser. No. 510,794, Aug. 2, 1995, abandoned.

[51] Int. Cl.$^6$ .................................................. B65B 43/42
[52] U.S. Cl. .............................. 53/576; 53/258; 53/567
[58] Field of Search ........................ 53/567, 512, 128.1, 53/570, 258, 260, 576, 529, 527, 391

[56] References Cited

U.S. PATENT DOCUMENTS

| | | | |
|---|---|---|---|
| 3,563,168 | 2/1971 | Doninger | 53/527 |
| 3,580,166 | 5/1971 | Longo | 53/529 |
| 3,687,061 | 8/1972 | Muller . | |
| 4,165,595 | 8/1979 | Pilley et al. | 53/567 |
| 4,235,063 | 11/1980 | Paetz | 53/258 |
| 4,557,368 | 12/1985 | Alameda | 53/391 |
| 4,590,739 | 5/1986 | Abatti et al. | 53/391 |
| 4,594,836 | 6/1986 | Good | 53/567 |
| 4,771,510 | 9/1988 | Kawai | 53/567 |
| 4,951,452 | 8/1990 | Lundahl et al. | 53/341 |
| 5,003,754 | 4/1991 | Stirling | 53/567 |
| 5,016,424 | 5/1991 | Stirling . | |
| 5,060,452 | 10/1991 | Tabor | 53/529 |
| 5,269,829 | 12/1993 | Meyer | 71/9 |
| 5,345,744 | 9/1994 | Cullen | 53/128.1 |
| 5,398,487 | 3/1995 | Inman et al. | 53/567 |
| 5,459,982 | 10/1995 | Long | 53/527 |

FOREIGN PATENT DOCUMENTS

| | | | |
|---|---|---|---|
| 1112943 | 8/1961 | Germany | 53/567 |
| 1960446 | 7/1971 | Germany | 53/529 |
| 2151116 | 8/1978 | Germany | 53/576 |
| 58-29277 | 6/1983 | Japan . | |
| 1508065 | 9/1989 | U.S.S.R. . | |
| 2199820 | 7/1988 | United Kingdom . | |

OTHER PUBLICATIONS

Article—Farm Journal, Mar. 1985.
Article—Power Farming, Jun. 1981.

Primary Examiner—Daniel Moon
Assistant Examiner—John Paradiso
Attorney, Agent, or Firm—Robert L. Harrington

[57] ABSTRACT

A machine arranged to insert material to be composted into an elongate elastic bag. The machine is arranged to insert an elongate perforated pipe into the elongate elastic bag with the material. The perforated pipe is fed from an air tight container through a conduit into the bag. The machine may have an expander mechanism to enlarge the opening of the elastic bag with the expanding mechanism defining a tunnel through which the material will be forced into the bag. A reciprocating plunger movable within a channel or hopper forces the material into the elongate bag. The machine is arranged so that the composting process may commence when there is material available to only partially fill the bag. When a bag is filled partially, the plunger is moved to a position at the entry of the tunnel to seal the open end of the bag and a media may be applied to dispense the media into the material via the perforated pipe to commence the composting process. The operation of the machine may be controlled remotely such as by a transmitter. Power for operating the mechanism of the machine may be provided by a motor mounted on the machine or from a tractor.

7 Claims, 4 Drawing Sheets

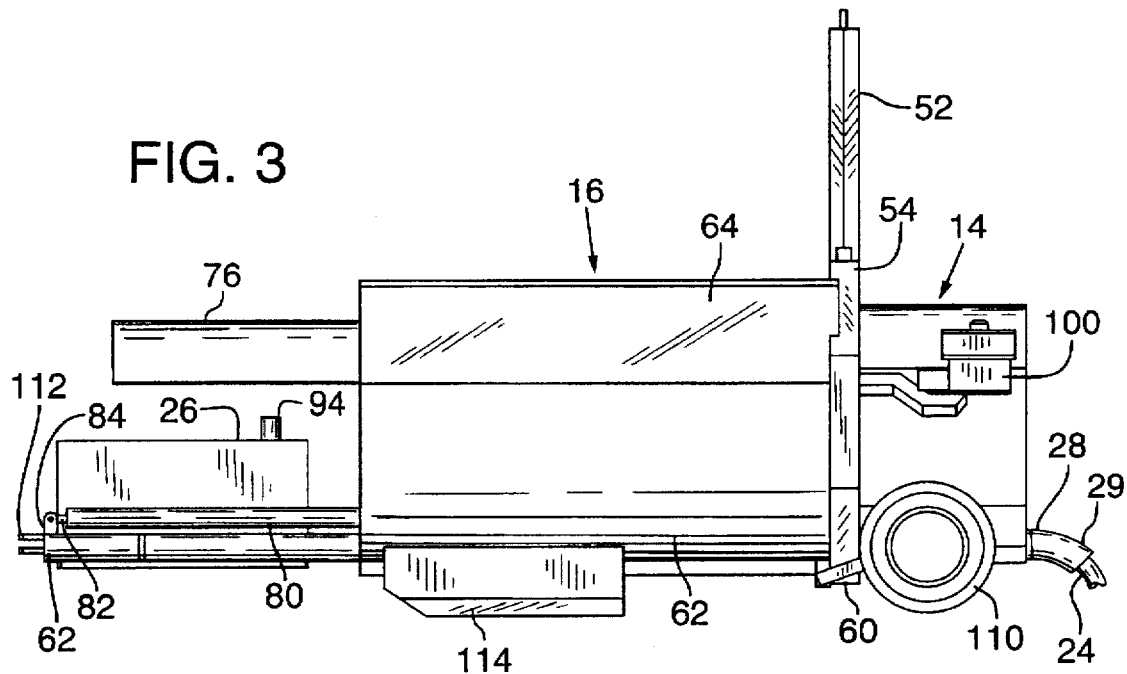
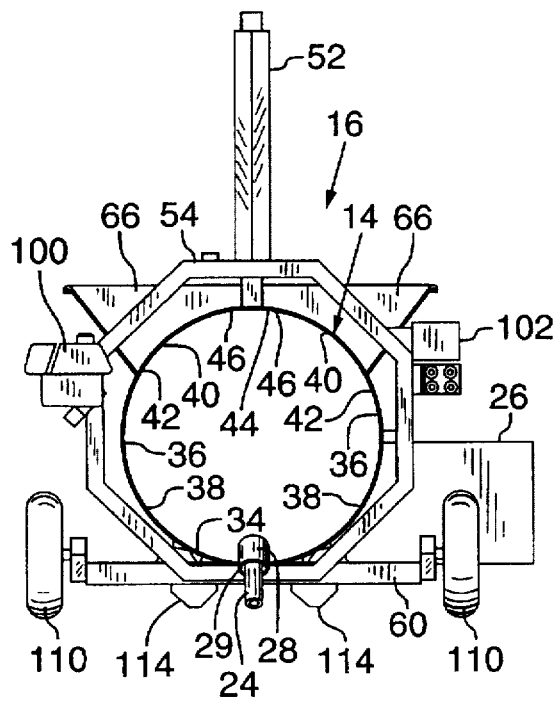
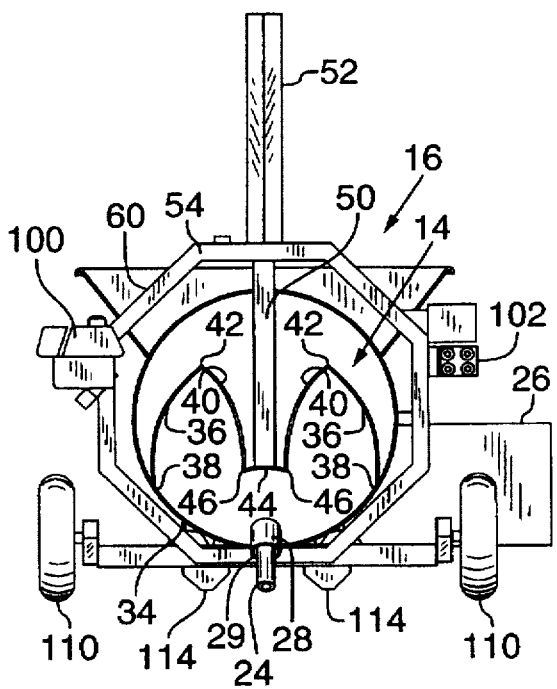

MATERIALS BAGGER AND SYSTEM

This application is a continuation of application Ser. No. 08/510,194 filed on Aug. 2, 1995 now abandoned.

FIELD OF THE INVENTION

This invention relates to the bagging of materials, e.g., for composting and/or storage including storage of farm crop materials, and more particularly to apparatus and systems for bagging quantities of loose material.

BACKGROUND OF THE INVENTION

Composting refuse materials is desirable for disposal of municipal refuse and the like. Systems and apparatus have recently been developed whereby large tubes or bags of heavy plastic, e.g., 8–10 feet in diameter and 200 feet long, are filled with refuse and aerated through perforated piping extended through the bags. A bagging machine includes a tunnel segment which carries the bag in an open position and the refuse is force fed into the tunnel and then the bag by a compacting rotor. Perforated piping is placed in the bag during the filling process and with the bag filled and sealed, the pipe end is connected to a media source (e.g., air) which is piped into the bag for treating (aerating) the material. Examples of such bagging machines and processes are disclosed in U.S. patent application Ser. Nos. 09/135,046, 08/296,314 and 08/435,144.

These prior machines and processes have been developed to satisfactorily bag and compost material for disposal of large quantities of refuse material where an 8–10 foot by 200 foot bag can be filled in a matter of days. The one or two day delay before initiating the composting action is not a concern.

A large percentage of municipalities are not large enough to have sufficient quantities of refuse material to efficiently use these prior systems. Such huge bags take weeks or months to fill and in the meantime the refuse is not being treated. Treatment requires disconnection of the machine from the bag and tying off the bag end. Once the bag is disconnected from the machine, reconnection is difficult and in any event, the refuse settles in the bag at the disconnected end and a series of such disconnections will likely result in uneven filling of the bag and uneven composting of the refuse material.

BRIEF DESCRIPTION OF THE INVENTION

In the preferred embodiment of the present invention, the bag is elastic and is substantially smaller in cross section than used in prior systems, e.g. 4–6 feet in diameter as compared to 10 feet in diameter. The bag is mounted onto a tunnel segment but has to be stretched over the tunnel. The elasticity of the bag produces a seal around the tunnel. Also, as the 4 or 5 foot diameter of refuse material (precompressed or compacted to the size of the tunnel) is forced through the tunnel into the bag, the bag elasticity collapses around the material to in effect grip the material to be composted to alleviate settling.

Filling of the bag is done with a piston or ram and a hopper arrangement. The piston extends through the hopper and into the tunnel, the piston being sized to the diameter of the tunnel. Thus, refuse material placed in the hopper is forced from the hopper and into the tunnel by a controlled reciprocating movement of the piston or ram. Filling of the bag results in the machine being forced to move in a direction away from the bag, which direction is hereafter referred to as the forward direction and the leading end and the trailing end as defined by that movement is referred to as the forward or front end and the rearward or rear end of the machine. A conduit extends from the front end of the machine through the hopper and through the tunnel. An air tight receptacle at the front end holds a coil of perforated pipe. The perforated pipe is fed from the receptacle through the conduit and into the bag as the bag is being filled.

When the available refuse material has been placed in the bag, the piston is positioned rearwardly with the piston seated in the tunnel and substantially closing the open end of the bag. The air tight receptacle is connected to a media source (typically air for aeration) which pressurizes the receptacle causing the media to flow through the perforated pipe into the refuse. When a new supply of refuse material is available, the piston is retracted and the fill process is resumed.

A number of features not described contribute to the utilization of the above preferred embodiment. For example, the tunnel may be collapsible to assist the operator in mounting elastic bags to the tunnel. Alternatively, the bag bay be a nonelastic plastic bag and the tunnel collapsible or not collapsible. A cover provided on the piston closes the hopper bottom overlying the piston to prevent refuse material form being dumped on the wrong side of the piston (on the forward side) during the feed cycle. Sensors and a remote control assist in control movement of the piston. These and other features unique to the apparatus and system will be made apparent from the detailed description that follows having reference to the attached drawings. Whereas the above background information and the embodiment hereafter described apply to composting, other materials, e.g., crop materials which are bagged for storage, may benefit from the bagging machine and system of this invention.

BRIEF DESCRIPTION OF THE DRAWINGS

FIG. 3 is a side view of the compost bagger of FIG. 1;

FIG. 5 is a rear end view of the compost bagger of FIG. 1; and

FIG. 6 is similar to FIG. 5 with the tunnel collapsed for receiving a bag.

DESCRIPTION OF THE PREFERRED EMBODIMENT

Figure 1:
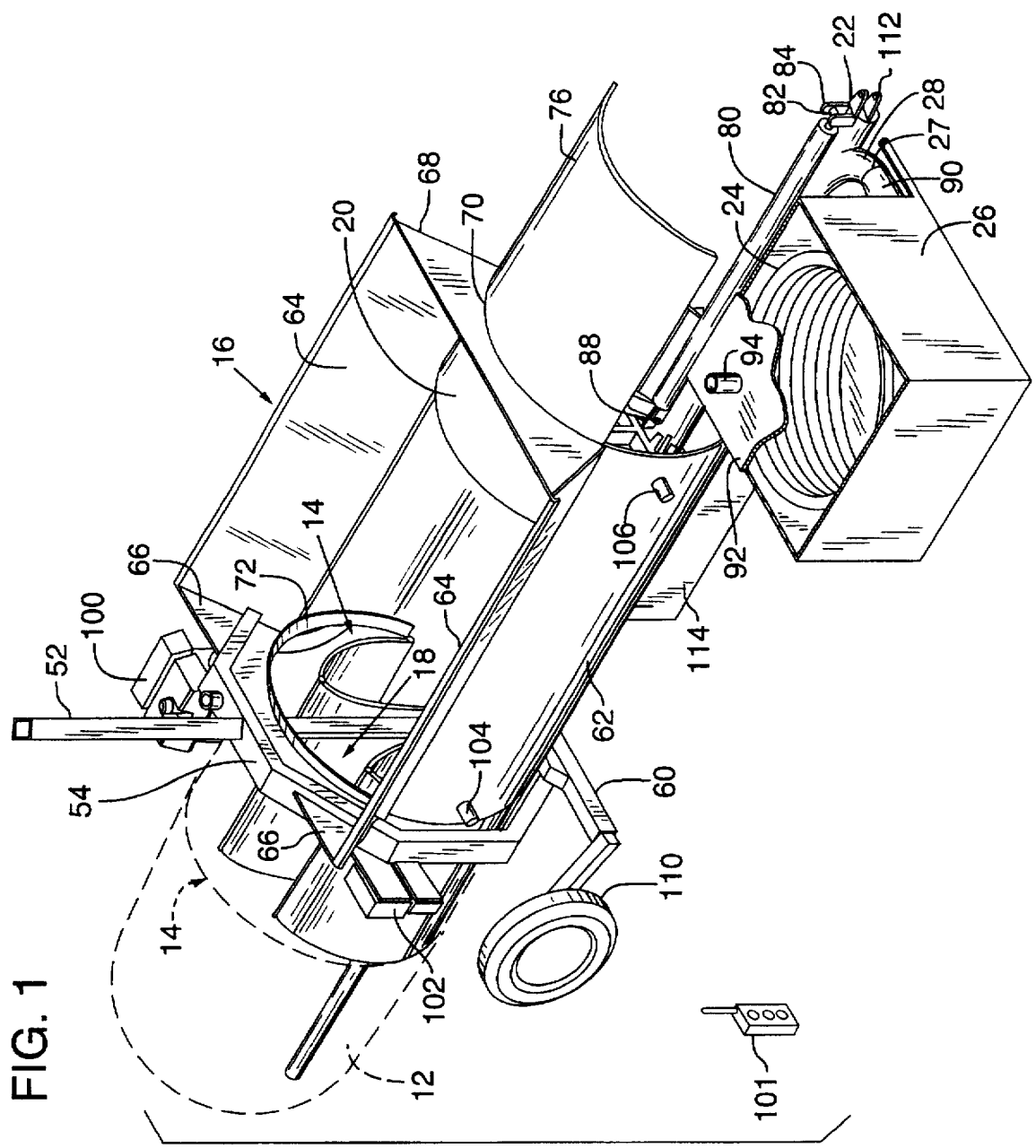
FIG. 1 is a perspective view of a compost bagger of the present invention.

Refer now to FIG. 1 of the drawings which illustrates a compost bagger of the present invention. In this embodiment the compost bagger is arranged to insert a perforated pipe 24 and material that is to be composted into an elongate elastic plastic bag 12. The bag 12 is preferably of the type that is elastic and may be stretched to enlarge its opening. Initially the bag 12 is placed on a bag expanding mechanism 14 in its collapsed state as shown in solid lines, and the mechanism 14 will enlarge the opening of the bag 12 as indicated in dash lines. The expanding mechanism 14 in its expanded condition functions as a tunnel as that term as known in the industry and in the expanded condition, said mechanism is hereafter sometimes referred to as the tunnel 14. A rear portion of the bag 12 is pulled off of the expander mechanism 14 and tied to form a closed end (not shown in the drawings).

The bag enlarging mechanism 14 (or tunnel 14) is placed strategio to a channel such as a hopper 16 and the hopper 16 has an opening 18 that communicates with the tunnel 14. Material that is to be composted and inserted into the bag 12 is deposited or dumped into the hopper 16. The compost bagger 12 has a movable plunger 20 that resides in and moves in the hopper 16 and when material is placed in the hopper 16, the plunger 20 will force material to be composted through the tunnel 14 via the opening 18 and into the bag 12.

As the material is forced into the bag 12, a portion of the bag 12 will be pulled off of the tunnel 14 and the bag 12 and the material placed therein will be deposited on the ground. The bag 12, being elastic, will compress around the material deposited therein as the bag is pulled off the tunnel 14. As the bagger 10 is cycled to force more material into the bag 12, the bag 12 with the material in it will serve as an anchor and as the plunger 20 forces additional material into the bag 12, the bagger will be moved away from the portion of the bag 12 that is deposited on the ground.

The bagger is arranged to insert a perforated pipe 24 into the bag 12 during the operation of filling the bag. The perforated pipe is housed in an air tight container 26 and is fed through a conduit 28 (best seen in FIG. 4). The perforated pipe 24 is utilized to introduce a media such as air into the material contained within the bag 12 to enhance the composting process.

The compost bagger is arranged to partially fill a bag with material to be composted or it is arranged to completely fill a bag 12 with material that is to be composted. When there is insufficient material to fill a bag 12, the material that is available is inserted into the bas 12 along with a length of the perforated pipe 24. The plunger 20 is moved to its rearward position to seal the opening 18 at the rear end of the hopper 16 and a media such as air is forced through the perforated pipe 24 to commence the composting procedure. The air tight container 26 has an extending pipe 94 which may be connected to a media source such as pressurized air.

When the bag 12 is filled completely, the end of the bag 12 is then pulled off the expander mechanism 14 and the end of the bag 12 is tied off and a non-perforated pipe coupling is connected to the perforated pipe 24 with the pipe coupling extended out of the bag and coupled to a media source.

The expander mechanism 14 is shown in FIG. 1 in both the expanded position and in a contracted position. The expander mechanism 14 in FIG. 1 is shown in the expanded condition by dashed lines. The expander mechanism 14 is moved to the contracted position to facilitate mounting a folded bag 12 on the expander mechanism 14. The end views of FIGS. 5 and 6 also show the expander mechanism 14 in the expanded state and in the contracted state. FIG. 5 illustrates the expander mechanism in the expanded state and FIG. 6 illustrates the mechanism 14 in the contracted state. As seen in FIG. 6, the expander mechanism 14 has a fixed base 34 that is in effect an extension of the bottom of the hopper 16. Two curved members 36 are attached to the base 34 by hinges 38 and thus are pivotable relative to the base 34 on the hinges 38. Curved members 40 are attached to the curved members 36 by hinges 42 and thus the curved members 40 are pivotable about the hinges 42. A curved center plate 44 is attached to the curved members 40 by hinges 46 and thus the curved members 40 may pivot about the short curved member 44 on the hinges 46. The curved plate 44 has one end fixedly attached to an end of a cylinder rod 50 of a cylinder 52. The cylinder 52 is fixedly attached to the upper horizontal member 54 of an octagonal portion of the machine frame 60. The expander mechanism 14 is thus movable to the contracted position as shown in FIG. 6 and to the expanded position as illustrated in FIG. 5 by action of the cylinder 52. The bag 12 is placed on the expander mechanism 14 when the expander mechanism 14 is in the contracted position as illustrated in FIG. 6. When the bag 12 is mounted on the contracted mechanism 14, the expander mechanism 14 is then expanded to the position as illustrated in FIG. 5 to thus stretch and enlarge the opening of the bag 12.

Figure 2:
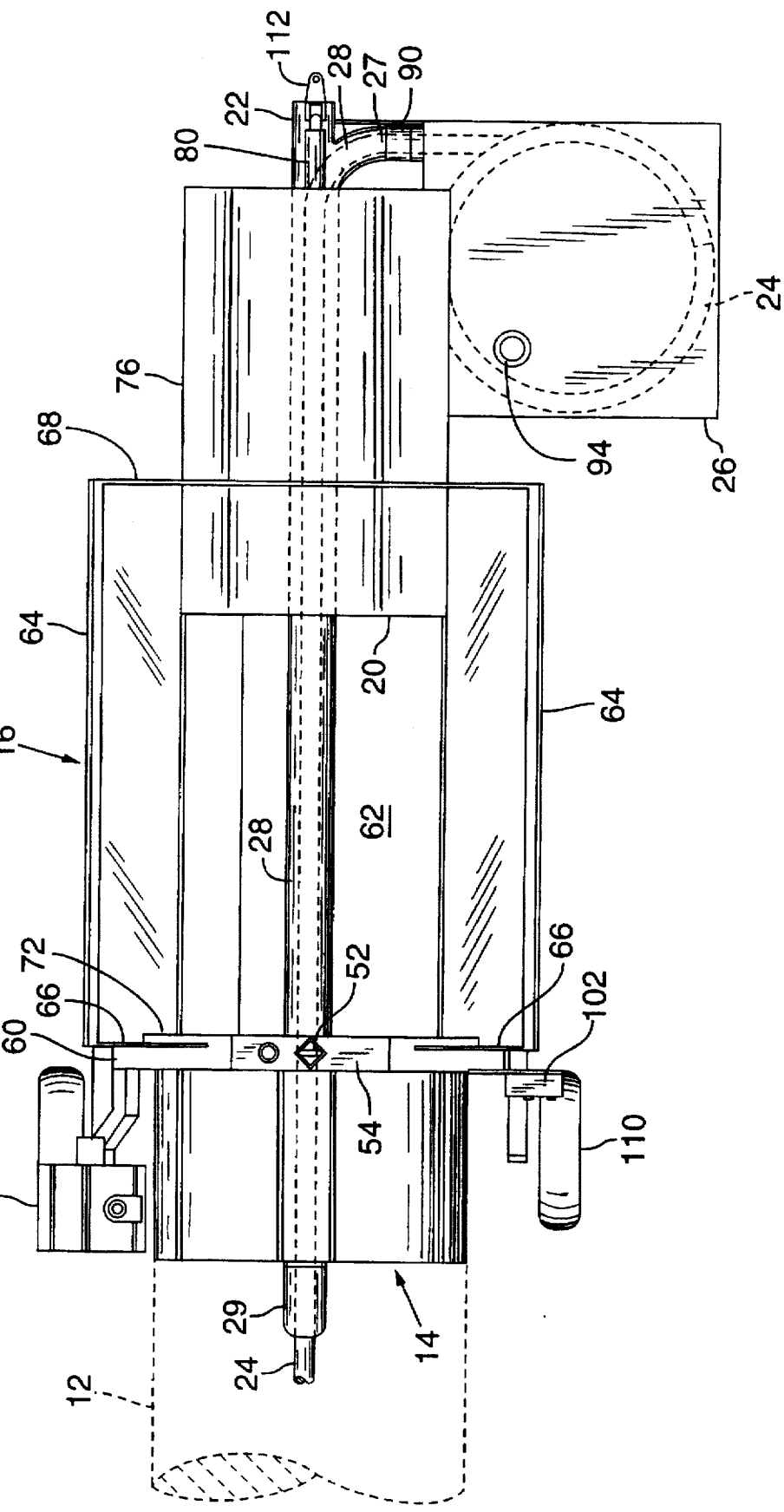
FIG. 2 is a top view of the compost bagger of FIG. 1.

The hopper 16 extends from the octagonal portion of the frame 60 on the opposite or forward side of the expander mechanism 14 as best seen in FIGS. 1 and 2. The hopper 16 has a curved bottom 62 that has substantially the same radius as the base 34 of the expander mechanism 14. Tapered walls 64 extend from the curved bottom 62 substantially as shown in FIG. 1. End walls 66 are fixedly attached to and extend from the octagonal frame 60 and the tapered side walls 64. The opposite or front end of the hopper 16 has an end wall 68 that is joined to each of the side walls 64. The end of the hopper adjacent the opening 18 into the tunnel 14 has a tapered flange 72 (best seen in FIG. 1).

The plunger 20 is slidably movable in the hopper 16 and is movable from the end wall 68 to the flange 72 at the opening 18. The plunger 20 is circular having substantially the same radius as the curved bottom 62 of the hopper 16. The plunger 20 is provided with a curved cover 76 that is mounted to the upper portion of the plunger 20 with the curved cover 76 extending from one side wall 64 to the other side wall 64. The end wall 68 of the hopper 16 is cut out at 70 (FIG. 1) to accommodate the movement of the cover 76. The cover 76 being fixedly attached to the plunger 20 will move with the plunger 20 as the plunger 20 is moved from one end of the hopper 16 to the other end of the hopper 16. The curved cover 76 will prevent material in the hopper 16 or additional material being deposited in the hopper 16 from falling on the forward side of the plunger 20 (forward having reference to the direction of movement of the machine) as the plunger 20 is moved rearward toward the opening 18. The plunger 20 has an opening 78 (FIG. 4) to accommodate the conduit 28 and thus as the plunger 20 is moved from end of the hopper 16 to the other, the plunger 20 will be sliding along the conduit 28. The plunger 20 is moved by a cylinder 80 that has a piston rod 82 pivotally mounted to a bracket 84 at the hitch end 22. The opposite end of the cylinder 80 is attached to the frame work 88 of the plunger 20 as seen in FIG. 1.

The air tight container 26 is removably mounted to the frame at the hitch end 22 of the bagger. The air tight container 26 has a coupling 90 that is fitted to the conduit 28 when the air tight container 26 is mounted to the frame of the bagger 10. The air tight container 26 is mounted to the frame of the bagger by conventional methods such as by bolting. The lid 92 of the container 26 has a pipe 94 to which an air source may be connected.

Figure 4:
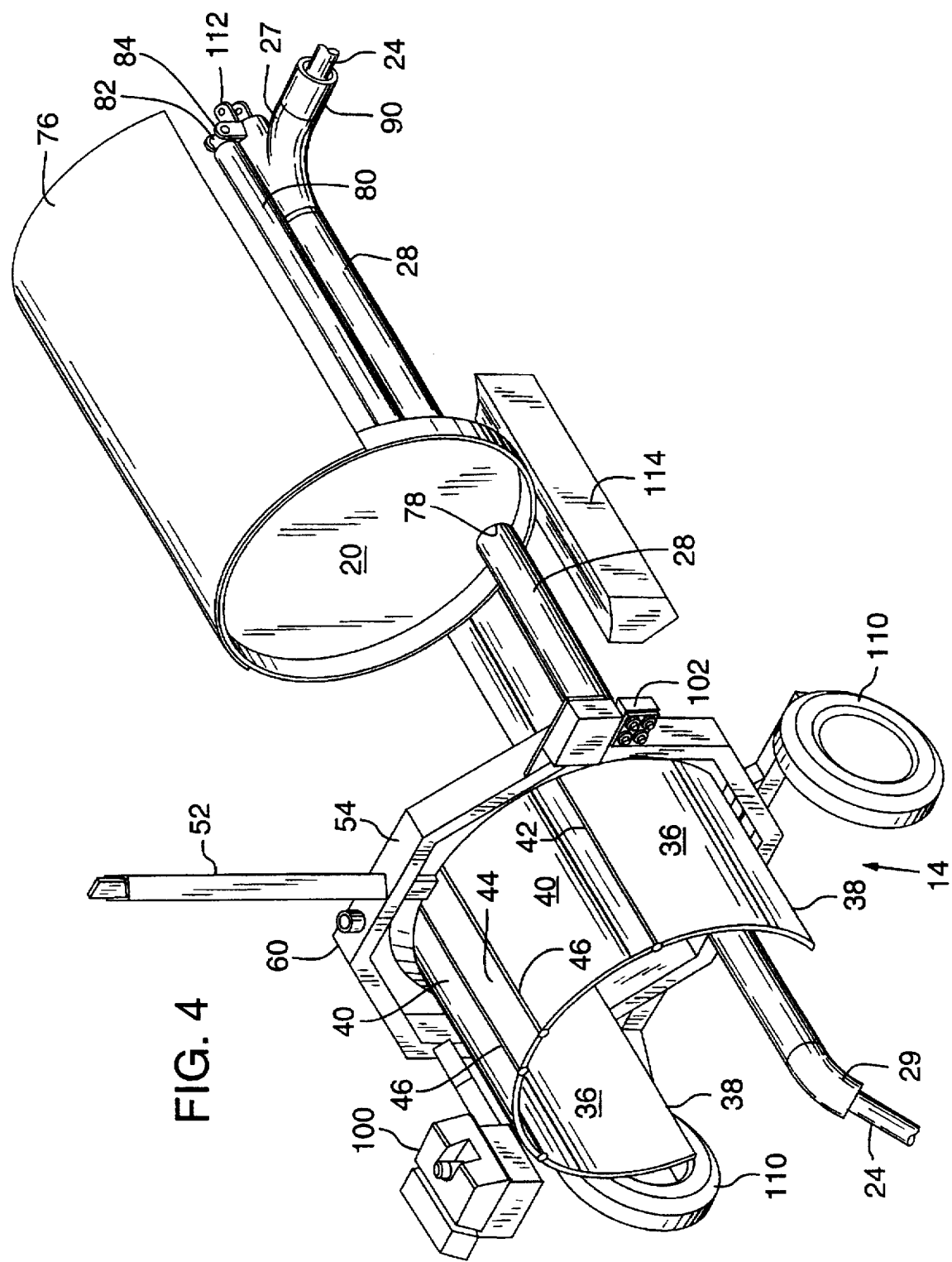
FIG. 4 is a perspective view from the opposite end of FIG. 1 but with parts removed.

The conduit 28 through which the perforated pipe 24 is fed extends from the hitch end 22 to just beyond the bag expander mechanism 14. The conduit 28 is best seen in FIG. 4 which is a partial view of the bagging machine of FIG. 1. The conduit 28 extends through the opening 78 in the plunger 20 and is arranged such that the plunger 20 may be slidably movable along the conduit 28. As seen in FIGS. 2, 5 and 6, the conduit 28 is above the base plate 34 of the expander mechanism 14 with the end 29 extending just beyond the base plate 34. The end 27 of the conduit 28 near the end 22 is arranged to receive the coupling 90 of the air tight box 26 when the air tight box 26 is mounted to the machine.

Whereas alternate embodiments may be provided with power from the tractor, in this embodiment, the bagger 10 has its own power unit 100 to supply motive power to the cylinders 80 and 52. Conventional controls 102 are provided to control the operation of the power unit 100 and the cylinders 80 and 52. Position sensors 104 and 106 (FIG. 1) are provided to sense the position of the plunger 20. Sensor 104 will sense the position of the plunger 20 when the plunger 20 has been moved to the opening 18 and the plunger 20 is positioned strategic to the flange 72. Sensor 106 will sense when the plunger 20 has been retracted fully toward the end wall 68.

The controls 102 may be operated by a remote device such as a transmitter 101 to control the operation and movement of the plunger 20. It is contemplated that an individual who may be operating a unit to deposit material into the hopper 16, such as a front end loader, may utilize the transmitter 101 to control the operation of the machine and particularly the movement of the plunger 20.

The bagger in this embodiment is a portable unit and is mounted on transport wheels 110. The bagger is connectable to a conventional towing unit such as a tractor by the hitch 112. When the bagger is disconnected from a towing unit, it is supported by the wheels 110 and also by skid plates 114 which are mounted to the frame 60 of the machine 10. The skid plates 114 support the hitch end of the machine and also aid in maintaining a straight line travel path as the machine is moved by action of inserting material into the bag 12. Whereas the skids provide some braking, to insure adequate filling the wheels 110 are desirably equipped with brakes to provide controlled braking of the machine in a manner known to the art.

In operation, the plunger 20 is retracted toward the end wall 68 of the hopper 16 with the position of the plunger 20 being sensed by the sensor 106. A folded bag 112 is installed on the expander mechanism 14 when the expander mechanism 14 is in the contracted state as illustrated in FIG. 6. The air tight container is mounted to the frame of the machine 10 and a coil of perforated pipe 24 is placed in the container 26. A length of the perforated pipe is fed through the conduit 28 until the end of the perforated pipe extends out of the end 29 of the conduit 28. The expander mechanism is moved to its expanded state (the tunnel state) to enlarge the opening of the bag 12. A portion of the bag 12 is pulled off the tunnel mechanism 14 and is tied to form a closed end. The end of the perforated pipe 24 extending out of the end 29 of the conduit 28 may also be secured to the tied end of the bag 12 or even extended out through the bag end for connection at that end to an air source/blower. (The end portion of the pipe extended outside the bag would likely be non-perforated.) However, as presently contemplated, the end of the pipe is simply anchored adjacent the bag end by the composted material forced into the bag as hereafter explained.

Material to be composted is deposited in the hopper 16. When a sufficient quantity is placed in the hopper 16, the plunger 20 is moved toward the opening 18 and in the process will force the material received in the hopper 16 through the tunnel defined by the expander mechanism 14 into the bag 12. As the plunger 20 is moved toward the opening 18 and with the material in the hopper 16, the cover 16 which is fixedly attached to the plunger 20 will prevent any material that is above the plunger 20 or additional material being added to the hopper 16 from falling on the forward side of the plunger 20.

As the material is forced into the bag 12, it will pull a length of the bag 12 off the expander mechanism 14 and the bag with the material therein will be deposited on the ground. When the plunger 20 has been moved to the opening 18 and its position sensed by sensor 104, the plunger is again retracted toward the end wall 68 of the hopper 16.

Should there not be sufficient material available to fill the bag 12, the plunger 20 will be moved to the opening 18 with the plunger 20 positioned at the flange 72 to thus seal the open end of the bag 12 which surrounds the tunnel (expander mechanism 14). Pressurized air or other media is applied to the material received in the bag 12. Pressurized air, for example, is applied to the air tight box 26 through the connecting pipe 94. Air will thus flow through the conduit 28 (and the pipe 24) to the bag 12. Air will be dispensed through the material in the bag 12 by the length of pipe 24 that has been inserted in the bag 12 with the material. The composting process may thus be started even though the bag 12 is only partially filled.

When additional material to be composted is available, the air flow to the material in the bag is discontinued. The plunger 20 is again retracted toward the end wall 68 and the additional material is deposited in the hopper 16. The plunger 20 is again moved toward the opening 18 to force material received in the hopper 16 into the bag 12. The cycle is continued until all of the material available has been deposited in the bag or the bag is at capacity. Should there be insufficient material to fill the bag, the plunger is positioned at the opening 18 and the composting process is commenced as previously described.

When the bag 12 is at capacity, the open end of the bag 12 is pulled off the expander mechanism 14. The perforated pipe 24 is cut off at a suitable length, a non-perforated coupling is attached and extended out the end of the bag. The end of the bag is tied to form a closed end. A media such as pressurized air is then connected to the perforated pipe 24 through the coupling extending out of the bag 12 to commence with the composting process.

Those skilled in the art will recognize that modifications and variations may be made without departing from the true spirit and scope of the invention. The invention is therefore not to be determined by the embodiments described and illustrated but is to be determined by the appended claims.

We claim:

1. A system for bagging large quantities of loose material such as grain and materials to be composted whereby a large bag containing such material is filled at and stored in the field, said system comprising:

a mobile bagging machine including a tunnel having an opening there through and a forward and rearward end, a materials holding channel permanently mounted to and extending forwardly of the tunnel, said channel having an open top receiving sequential loads of loose material to be bagged, and a piston having a solid rear face sized ad configured to closely fit the channel and the forward end of said tunnel, said piston mounted for reciprocating movement between a retracted position forward of the material deposited in the channel and through the channel into the forward end of the tunnel for movement of the material from the channel into the tunnel;

a bag having an end opening and mounted on and surrounding the rearward end of the tunnel and closing the rear opening, said bag provided on said tunnel in a folded condition and upon receiving the material forced through the tunnel and into the bag by the piston, said machine being advanced as the bag is filled, the bag accordingly being deployed off the tunnel;

said tunnel, channel, piston and bag functioning as an integral on site unit and it cooperation with hauling units hauling multiple loads of the material to the site, said channel sequentially receiving said multiple loads and said reciprocating piston in a plurality of reciprocating movements, sequentially moving said loads through the channel and tunnel for deposit into said bag;

controls controlling said sequential movement of the piston and for selectively positioning the piston in the tunnel entry as desired for holding the material in the bag between loads;

a conduit extended from the exterior of the machine into and through the tunnel and into the bag, and a length of pipe mounted on the machine for feeding of the pipe through the conduit and into the material being bagged; and said conduit connectable to a media source with said piston closing the tunnel front and opening with the bag in a partially filled condition for circulating media from the media source into the material in the bag between loads.

2. A system as defined in claim 1 wherein the bags are elastic and in a relaxed state have a smaller end opening than the tunnel, said tunnel being collapsible and a motor member for collapsing and expanding the tunnel whereby the tunnel is collapsed for mounting the bag to the tunnel and expanded to thereby stretch the bag opening.

3. A system as defined in claim 1 wherein said pipe is perforated and including an air tight receptacle mounted to the machine, said length of pipe in coiled form contained in the receptacle with an end thereof fed directly into the feed conduit and from the conduit into the bagged material, and an air pressure source connectable to the receptacle for pressurizing the receptacle and thereby forcing air into and through the perforated pipe and into the bagged material.

4. A system as defined in claim 1 wherein a motor mounted on the machine provides power for reciprocal movement of the piston.

5. A system as defined in claim 1 wherein the channel is provided as a hopper having an open top for receiving loose material, a cover provided on said piston and extended forwardly of the piston, said cover being moved into the hopper as the piston is moved toward the tunnel, said cover configured to close the hopper over the piston with the piston positioned at the forward position in the forward opening of the tunnel.

6. A system as defined in claim 3 wherein the channel is provided as a hopper having an open top for receiving loose material, said loose material being refuse for composting, whereby said bag can be partially filled and with the piston positioned in the tunnel opening, the refuse material in the bag can be treated for composting.

7. A system as defined in claim 3 wherein the conduit extends from a position forward of the channel and extends through the channel and through an opening in the piston and into the tunnel, said piston being slidable relative to the conduit.

* * * * *

UNITED STATES PATENT AND TRADEMARK OFFICE
CERTIFICATE OF CORRECTION

PATENT NO. : 5,724,793
DATED : March 10, 1998
INVENTOR(S) : Inman

It is certified that error appears in the above-identified patent and that said Letters Patent is hereby corrected as shown below:

Col. 6, line 54, replace "ad" with --and--.

Col. 7, line 19, replace "and" with --end--.

Signed and Sealed this

Ninth Day of June, 1998

Attest:

BRUCE LEHMAN

Attesting Officer  Commissioner of Patents and Trademarks